United States Patent

Violette et al.

[11] Patent Number: 5,163,817
[45] Date of Patent: * Nov. 17, 1992

[54] ROTOR BLADE RETENTION

[75] Inventors: John A. Violette, Granby, Conn.; Thomas Mashey, Montgomery, Ohio

[73] Assignee: United Technologies Corporation, Hartford, Conn.

[*] Notice: The portion of the term of this patent subsequent to May 21, 2008 has been disclaimed.

[21] Appl. No.: 695,639

[22] Filed: May 3, 1991

Related U.S. Application Data

[63] Continuation-in-part of Ser. No. 422,190, Oct. 16, 1989, Pat. No. 5,017,092.

[51] Int. Cl.⁵ .................................. F01D 5/30
[52] U.S. Cl. ........................ 416/204 A; 416/220 R; 416/500
[58] Field of Search ............... 416/204 R, 204 A, 217, 416/220 R, 220 A, 248, 500

[56] References Cited

U.S. PATENT DOCUMENTS

| 2,821,357 | 1/1958 | Schorner | 416/217 |
| 2,944,787 | 7/1960 | Gingras | 416/217 |
| 3,487,879 | 1/1970 | McCarthy et al. | 416/220 |
| 3,694,104 | 9/1972 | Erwin | 416/217 |
| 3,867,066 | 2/1975 | Canova et al. | 416/500 |
| 4,175,912 | 11/1979 | Crane et al. | 416/500 |
| 4,877,376 | 10/1989 | Sikorski et al. | 416/248 |
| 5,017,092 | 5/1991 | Violette et al. | 416/204 A |

FOREIGN PATENT DOCUMENTS

| 488971 | 12/1952 | Canada | 416/500 |
| 826332 | 12/1951 | Fed. Rep. of Germany | 416/248 |
| 74606 | 7/1978 | Japan . | |
| 113324 | 2/1918 | United Kingdom | 416/207 |
| 621315 | 4/1949 | United Kingdom | 416/217 |

Primary Examiner—John T. Kwon

[57] ABSTRACT

A rotor blade (1) is disclosed which recenters itself in relation to the retention member (10) in which it is installed. Imposition of an external force (A) upon the rotor blade (1) creates a moment (M) which acts about the rotor blade's root (3). Recentering is accomplished by centrifugal forces acting through an offset distance (C") resulting from an off-center rotation of the blade and its captivated shaped retaining pin (6) within a plurality of retention member tenons (12), achieving an enhanced opposing restorative moment (M'$_R$) on the rotor blade (1). The retention member tenons (12) contain arcuate bearing surfaces (8) which bear against a corresponding arcuate surface (9) with a smaller radius of curvature lengthwise disposed on the shaped retaining pin (6).

5 Claims, 2 Drawing Sheets

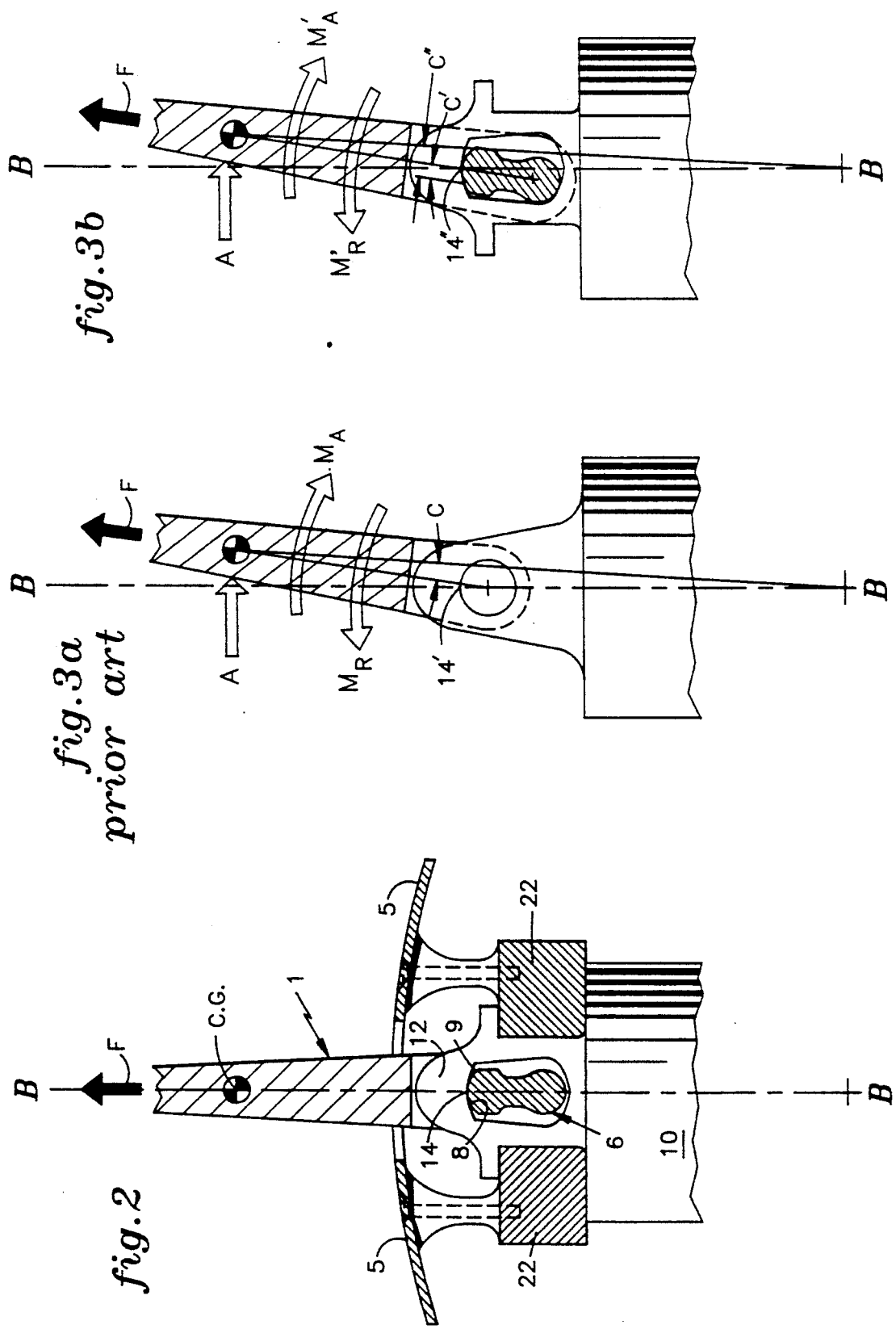

ROTOR BLADE RETENTION

CROSS REFERENCE TO RELATED APPLICATIONS

This application is a continuation-in-part of U.S. Ser. No. 07/422,190, filed Oct. 16, 1989 now U.S. Pat. No. 5,017,092.

1. Field of the Invention

This invention relates to rotor blades, and the retention members they are installed in, used in rotary machines.

2. Background of the Invention

Rotary machines contain rotor blades installed in rotatable hubs or disks in axial orientation. These rotor assemblies typically contain a plurality of aerodynamically shaped blades, or airfoils, which operate at high speeds and in hostile environments. As a result, the rotor blades are subjected to steady and vibratory loads which generate significant internal and external stresses.

Properly designed rotor blades can accommodate most known loads, resulting in the long and safe operation of the rotary machine. These loads are derived from inertial and aerodynamic sources. Inertial loading depends on rotor blade mass and stiffness distribution, and impacts the vibratory response and frequency tuning of the rotary machine. Aerodynamic loading depends on both steady state and disturbed air flow through the rotary machine. These loads then cause a variety of stresses, such as centrifugal, bending, and torsional, and in particular vibratory bending, to the blade and rotary machine. In the case of vibratory bending stresses, it is known that resonant frequency tuning of the rotor blade aids in the control of vibratory response to unsteady loading.

The main source of steady state internal stresses in rotating parts within a rotary machine is centrifugal force. In a rotary machine any typical cross-sectional area of the rotor blade must restrain the centrifugal force acting on all of the material radially outward of its own radial location in relation to the machine's axis of rotation. It necessarily follows that the largest forces sustained by a rotor blade occur in the blade's root structure. These forces are then transferred through a rotor blade retention apparatus to a centrally-located rotatable hub. In a pinned-root rotor blade these forces are passed from the rotor blade root through retention tenons which are attached to the retention member which is secured to the rotatable hub.

Additional sources of blade stress include foreign object contact, changes in flight altitude and attitude, as well as aircraft-induced shock and vibration. In particular, propulsor blades mounted in an aft position as called for in some aircraft designs are more susceptible to foreign object damage than are normal wing-mounted propulsors. Damage to those aft-mounted blades may be caused by collisions with runway water and slush, ice, sand, stones, and other debris kicked up by the aircraft's tires. Another potentially serious cause of damage to propulsor blades is inflight bird strikes.

An important problem with rotor blades is accommodation of the aforementioned stresses when the blade is subjected to the operational and adverse stressing conditions described above.

The related art generally teaches the use of a pinned-root engagement to securely capture the blade to the rotor hub, and reduce or relieve root bending stresses. However, pinned-root attachments may experience frictional sliding of blade roots against their retention tenons and retaining pins as installed in a rotatable hub, which may result in undesirable heating, wear, and fretting of the mating surfaces and underlying structures. Additional fretting and wear of the pin and tenon interface is known to occur at powerplant shutdown, at which time the windmilling propulsor is subjected to little or no centrifugal loading, thereby allowing the propulsor to freely flex in its mounting due to gravitational force. Also, this type of engagement provides limited accommodation of the external stresses and moments imposed on the blade upon contact with foreign objects. These problems have impeded desired extension of rotor blade service life.

What is needed is a new pinned-root design which can minimize and/or accommodate those forces, moments, and angular excursions of the rotor blade about the pin axis which cause undesirable wear and fretting of a rotor blade connection with a retention member installed in a rotatable hub.

SUMMARY OF THE INVENTION

It is thus an object of the present invention to provide a new retention design for a rotor blade that enhances the effectiveness of centrifugal restoring forces inherent in a rotary machine to limit angular motion of the rotor blade and restore the rotor blade to its proper position in a retention installed in a rotatable hub after encountering any of a variety of forces and moments during rotational operation.

It is another object of the present invention to provide a new design for a rotor blade that minimizes the heating, wear, and fretting of a rotor blade root and its mating bearing surfaces.

It is a further object of the present invention to accommodate the localized external stressing at the root attachment of a rotor blade caused by foreign object collision.

These and other objects will become apparent in the further course of this disclosure.

According to the present invention, a rotor blade is attached to a retention member with a slidably removable pin. The blade's root is mated with a plurality of retention tenons mounted on the retention member, and the pin is passed through this junction to attach both components together. This pin has a lengthwisely disposed arcuate bearing surface which bears against a corresponding arcuate bearing surface inside the retention tenons. Each retention tenon's arcuate bearing surface has a larger radius of curvature than the pin's arcuate bearing surface, the difference in radii providing an eccentric moment arm through which an offsetting force acts to produce a desired restorative moment to the off-center rotor blade. Thus, imposition of a force on the blade causes the blade to "rock" within the tenons with a limited range of motion in response to these opposing forces and the restorative moment.

The retention design according to the present invention enhances the self-centering behavior of a rotor blade subjected to externally-imposed forces, wherein the rotor blade recenters itself in relation to the retention member and the rotatable hub by utilizing centrifugal force inherent in the rotary machine under operating conditions. Further, elastomeric pads or bumpers are provided to offer restraint against large bending excursions and offer some measure of radial preload during shutdown "windmilling" conditions, provide an additional measure of bending stiffness to tune out undesirable blade resonant frequencies, as well as to offer a means of vibratory damping to help control dynamic blade instabilities.

Bearing stress, and hence wear, is minimized by this rocker mechanism, which is subjected to rolling friction, rather than sliding friction and thus allows the rotor blade to more efficiently resume its centered position. As compared with the stresses resulting from sliding friction and resulting frictional losses incurred in prior art pinned-root connections, the stresses imposed on the rotary machine resulting from the rocking action of the present invention are lower. The elimination of sliding friction between the corresponding arcuate bearing surface results in significant reduction in wear, heat generation, and fretting in the vicinity of the connection's bearing surfaces and their underlying structures.

BRIEF DESCRIPTION OF THE DRAWINGS

FIG. 2 is a sectional view of the retention system.

FIG. 3A is a geometrical representation of the applied, and resultant, force and moment vectors affecting the pin-root connection of the prior art.

FIG. 3B is a geometrical representation of the force and moment vectors of the present invention.

DETAILED DISCLOSURE

Figure 1:
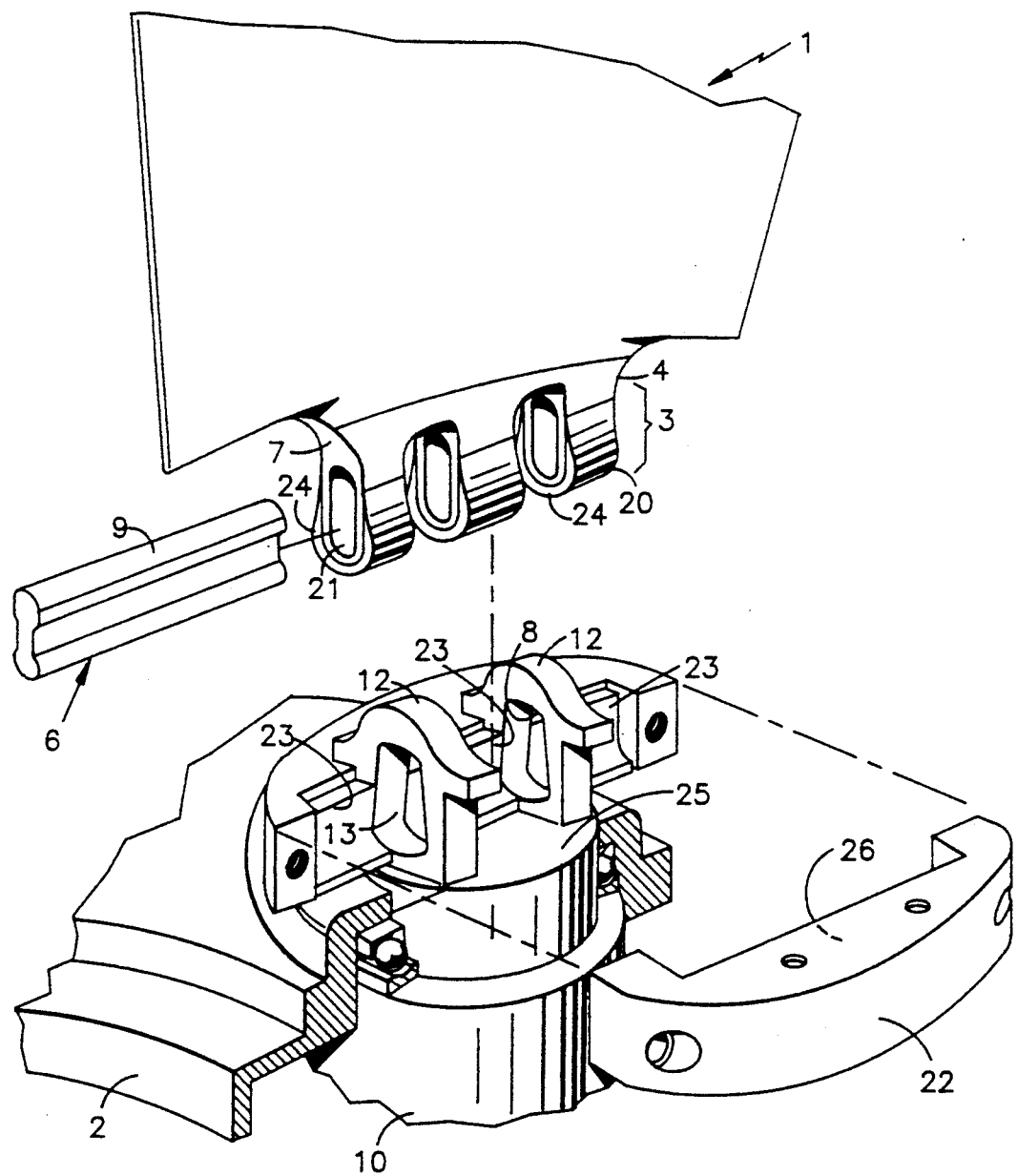
FIG. 1 is an exploded view of the rotor blade retention system of the present invention.

FIG. 1 diagrammatically represents a rotor blade 1 having a plurality of spanwisely inwardly disposed blade tenons 20 which are matable with a plurality of retention member disposed retention tenons 12 at the blade root 3. The hub retention tenons 12 are mounted on a retention member 10 which is positioned in a rotatable hub 2 in one embodiment.

The rotor blade 1 is attached to the retention member tenons 12 by a pin 6 which is chordwisely disposed through the meshed retention member tenons 12 and blade tenons 20, and may be introduced to the meshed tenons 12, 20 from either the leading edge 7 or trailing edge 4 of the rotor blade 1. Assembly of the rotor blade 1 to the retention member 10 is accomplished by first aligning the blade tenon openings 21 with the retention member tenon openings 13, then sliding the pin 6 longitudinally through the aligned openings 21, 13 so that the arcuate surfaces 8 of the retention member tenons 12 bear against the arcuate surface 9 of the pin 6. The pin 6 is held against rotation by its complimentary shaped blade tenon openings 21.

Insertion of the pin 6 causes the arcuate bearing surfaces 8 of the retention member tenons 12 to bear against the arcuate bearing surface 9 of the pin 6, allowing for a predetermined range of rolling contact motion between the two surfaces 8, 9. Means for limiting longitudinal excursions of the pin 6, and the blade 1 in which it is installed, in relation to the retention member tenons 12 may be incorporated into the design of the pin 6 and/or the retention tenons 12 and/or an annular collar 22. That is, the pin 6 is chordwisely restrained within the meshed tenons 12, 20 by the split annular collar 22 which is circumferentially disposed about the meshed connection as shown in FIG. 1.

FIG. 2 shows the arrangement of the arcuate bearing surface 9 of the pin 6 in relation to the arcuate bearing surfaces 8 of the retention member tenons 12. The arcuate bearing surfaces 8 of the retention member tenons 12 have a larger radius of curvature than the arcuate bearing surface 9 of the pin 6, allowing for anticipated circumferential deflection. Based on experience, this design can accommodate blade excursions of approximately ±5 degrees or more, by rolling contact of the pin 6 about the arcuate bearing surface 8, upon application of an external force A to the rotor blade 1. A maximum excursion of approximately ±10 degrees can be accommodated by the shown embodiment, but alternative ranges of deflection will occur to those skilled in the art and are deemed to be within the scope of the invention as defined by the appended claims.

Referring again to FIG. 1, elastomeric or honeycomb spacers 23 are disposed between the pin 6 and the collar 22 to further control blade excursion within the retention member tenons 12.

The pin 6 has a shaped oblong cross-section having an arcuate bearing surface 8 disposed at one end. This arcuate surface 8 bears against a corresponding arcuate surface 9 of the retention member tenon 12, which has a significantly larger radius of curvature, as will be further discussed below. Both surfaces 8, 9 are partially cylindrical in cross-section. The pin 6, together with the hub retention member tenons 12, is spanwisely dimensioned to minimize spanwise extension and contraction of the meshed root connection between the tenons 12, 20 during start-up and shut-down, respectively, of the rotary machine. In addition, an elastomeric bumper 24 disposed on a radially outer surface of a blade retention tenon 20 impacts an elastomeric bumper 23 disposed on an opposing inner collar face 26 to limit a blade root excursion. The elastomeric bumper 24 also extends spanwisely inwardly of the blade tenon 20 to minimize freeplay of the blade tenon 20 against a spanwisely corresponding retention member internal surface 25, especially during rotary machine shut-down. These bumpers 24 thus actively engage with the aforementioned spacers 23 disposed between the pin and the collar, yet act independently of the rocker mechanism of the present invention.

Referring back to FIG. 2, a contoured blade hole filler 5 in two halves is attached radially outwardly of the retention member 10 after installation of the blade 1 to mate with the propulsor spinner surface (not shown) and to minimize connection-induced turbulent airflow. The external position of the blade hole filler 5, which provides access to the removable annular collar 22, and in turn to the inserted pin 6 located thereunder, also allows for expedient rotor blade assembly/disassembly and attendant inspection.

FIGS. 3A and 3B vectorially represent the initial and resulting forces on the rotor blade 1 upon application of an externally imposed force A to the rotor blade 1 during counter-clockwise operation of the rotary machine, in contrast to the blade 1 as shown in FIG. 2 which is subjected only to pure centrifugal loading F. FIG. 3B vectorially shows the enhanced moment arm C'' of the present invention, which is larger than the prior art's moment arm C (FIG. 3A) by an indicated length C'.

When externally imposed force vector A has a component which is perpendicular to the line of centers B—B passing through the rotor blade 1, the pin 6, and the line of contact 14 of the arcuate bearing surfaces 8, 9, a clockwise moment $M_A$ (for a counter-clockwise rotating hub in a rotary machine) is created through the rotor blade 1 about the pin 6. This perpendicular component of force vector A is shown as being applied at the rotor blade's center of gravity C.G. The clockwise moment $M_A$ causes the blade 1, and its captivated pin 6, to roll about the arcuate bearing surface 8 of the retention member tenon 12 displacing the line of contact 14 between the bearing surfaces 8, 9 to a new position 14'. A centrifugal restorative force F acts through a certain offset distance C in a prior art root connection, as shown in FIG. 3A. A significant increase in displacement C' between C (the displacement of the blade root in the prior art configuration) and C" (the cumulative displacement of the blade root of the current invention) provides an enhanced restorative moment to the rotor blade due to the application of the centrifugal restorative force F through the lengthened moment arm C". This increase in moment arm length is caused by the shift of the line of contact 14 to an enhanced new position 14", which is shown in FIG. 3B.

According to FIG. 3B, the centrifugal force F created by the operating rotary machine acts through the rotor blade's enhanced displacement C", creating a counter-clockwise moment $M''_R$, and hence a counter-clockwise rotation of the rotor blade 1, resulting in the rocking motion of the blade root 3 along the path defined by the arcuate bearing surface 8 of the retention member tenon 12. This resulting rocking motion emulates roller bearing behavior and slows and restores the rotor blade 1 to a centered position.

Further, the rolling contact between the arcuate bearing surfaces 8, 9 minimizes the heating, wear, and fretting of a rotor blade root 3 and its mating surfaces 8, 9 which occurs in prior art pinned-root connections.

Finally, certain benefits of pinned-root connections are retained. These benefits include, among others, the capability of designing for necessary damping, resonant frequency tuning, and high speed stability requirements typical of the turbomachinery field, as well as allowing for expedient rotor blade assembly/disassembly and attendant inspection.

Further modifications and improvements of the invention herein disclosed will occur to those skilled in the respective arts and all such modifications and improvements are deemed to be within the scope of the invention as defined by the appended claims.

We claim:

1. A system for retaining and restoring the position of a rotor blade, comprising:

a retention member, including at least one hub retention tenon mounted thereon, and
a curved first bearing surface disposed within the chordwisely disposed hub retention member tenon,
a rotor blade, including:
a blade root with a shaped root retention tenon chordwisely disposed therein,
wherein the blade root tenon spanwisely meshes with the retention member tenon, and
a pin, non-cylindrical in cross-section, received within the root tenon and extending into the retention member tenon, including a second lengthwise arcuate bearing surface disposed thereon, said second bearing surface matable with the first bearing surface disposed within the chordwisely disposed retention member tenon, wherein the radius of curvature of the first bearing surface is substantially larger than the radius of curvature of the second bearing surface, said bearing surfaces in combination effecting a restoring moment upon said rotor blade when a force external to the system is imposed thereon and transferred therethrough to the pin, said restoring moment produced by centrifugal force acting through a moment arm defined by said rotor blade's angular displacement at its center of gravity, wherein said pin is restrained against rotation relative to the blade root by a root tenon surface shaped complimentary to the pin's non-cylindrical cross-section.

2. The system as claimed in claim 1, wherein the mating bearing surfaces are partially cylindrical in cross-section.

3. The system as claimed in claim 1, wherein the pin is removable.

4. The system as claimed in claim 1, wherein operational deflection of the rotor blade in relation to the pin by rotation of said rotor blade about said pin is ±5 degrees.

5. The system as claimed in claim 1 further including a bifurcated collar annularly disposed about the meshed tenons and pin, wherein an elastomeric bumper disposed on a radially outer surface of a root retention tenon impacts an elastomeric bumper disposed on an opposing radially inward collar face to limit a blade root excursion.

* * * * *